United States Patent [19]
Horrobin

[11] Patent Number: 4,738,853
[45] Date of Patent: Apr. 19, 1988

[54] FOOD PRODUCTION

[75] Inventor: David F. Horrobin, Surrey, England

[73] Assignee: Efamol Ltd., Surrey, England

[21] Appl. No.: 719,953

[22] Filed: Apr. 4, 1985

[30] Foreign Application Priority Data

Apr. 6, 1984 [GB] United Kingdom ............... 8408974

[51] Int. Cl.$^4$ .............................................. A23K 1/00
[52] U.S. Cl. ...................................... 426/2; 426/630; 426/807
[58] Field of Search ................... 426/2, 602, 623, 630, 426/635, 807

[56] References Cited

U.S. PATENT DOCUMENTS 4,128,640 12/1978 Klein .

FOREIGN PATENT DOCUMENTS

| 0092976 | 11/1983 | European Pat. Off. . |
| 157619 | 9/1985 | European Pat. Off. . |
| 1476511 | 4/1967 | France . |
| 51-57565 | 5/1976 | Japan ..................................... 426/2 |
| 624624 | 6/1949 | United Kingdom . |
| 852189 | 10/1960 | United Kingdom . |
| 1356002 | 6/1974 | United Kingdom . |
| 1446431 | 8/1976 | United Kingdom . |
| 2084172 | 4/1982 | United Kingdom . |

OTHER PUBLICATIONS

Sekizaki et al, "Influence of Dietary Supplement of Various Oils on the Fatty Acid Composition of Hens Eggs", Jap. J. of Zootech. Sci., 1975, vol. 46, pp. 251–256.

Cunnane et al, "Accumulation of Linoleic & γ Linolenic Acids in Tissue Lipids of Pyridoxine Deficient Rats", J. of Nutrition, (1984), pp. 1754–1761.

Huang et al, "Effect of Dietary α and γ Linolenic Acid on Tissue Fatty Acids in Guinea Pigs", Proc. Exptl. Biol. & Medicine, 1985, pp. 46–49.

Larking et al, Increased Levels of Esterified Arachidonic Acid in Plasma by Feeding γ Linolenic Acid Nutrition & Metabolism (1975), vol. 19, pp. 127–130.

Becker, "Oil of Evening Primrose–A Source of Fatty Acids of Therapeutic and Dietary Interest, Chem. Abstracts, vol. 99, Abstract No. 37266m (1983).

*Primary Examiner*—R. B. Penland
*Attorney, Agent, or Firm*—Nixon & Vanderhye

[57] ABSTRACT

A method of maintaining hens or other domesticated birds for egg production, comprises giving the birds feed supplemented with γ-linolenic acid or one or more higher acids in the n-6 series, in the form of the free acid or as an ester, amide, phospholipid, salt or other physiologically acceptable derivative convertible in the bird's body to, or having the effect of, the free acid.

2 Claims, No Drawings

FOOD PRODUCTION

FIELD OF INVENTION

The invention relates to egg production by domesticated birds, particularly fowls.

GENERAL DISCUSSION

Eggs are one of the major sources of cholesterol in the diet, and currently renewed concern about the relationship of cholesterol to cardiovascular disease has led to the cholesterol content of eggs becoming an important barrier to increased consumption. There is, however, little or no cholesterol in the diet of hens and if cholesterol biosynthesis by the hen could be reduced, this might enable an egg to be produced with a lower content of cholesterol.

A high intake of linoleic acid in the diet has long been known to reduce plasma cholesterol in humans, though the mechanism is unknown. We have found that the linoleic acid must be converted to γ-linolenic acid (GLA) if it is to be effective, GLA being 100–200 times more potent at lowering human plasma cholesterol than is linoleic acid. It is uncertain as yet whether GLA or one of its metabolites is involved, but dihomo-γ-linolenic acid (DGLA), arachidonic acid (AA), 22:4n-6 and 22:5n-6, and the prostaglandins and related substances derived from DGLA, AA or 22:4n-6, are all possible candidates for the final active metabolite, the relations between them being as set out in the following diagram:

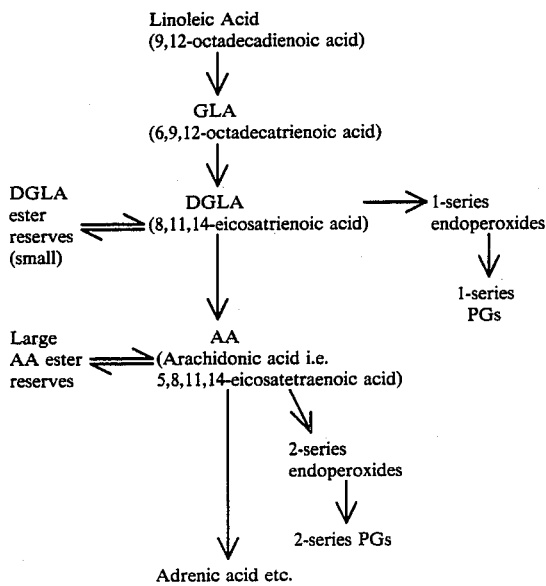

The broad outline of this pathway is well known, and it brings out clearly that a major function of essential fatty acids is to act as precursors for prostaglandins, 1-series PGs being formed from DGLA and 2-series PGs from arachidonic acid. Further, it has recently been found that the 22:4n-6 acid produced from arachidonic acid gives rise to a series of homo-2-series PGs though their importance is as yet unknown.

DGLA is the key substance. GLA is almost completely and very rapidly converted in the body to DGLA and so for practical purposes the oral administration of DGLA and GLA amounts to the same thing. DGLA can be converted to a storage form or to PGs of the 1-series or, through arachidonic acid, to PGs of the 2-series.

The pathways of metabolism of the n-6 essential fatty acids and the related n-3 acids sharing, it is believed, common enzymes in the two pathways, are:

| n-6 | n-3 |
|---|---|
| 18:2 $\Delta^{9,12}$ (linoleic acid) | 18:3 $\Delta^{9,12,15}$ (α-linolenic acid) |
| ↓ $\Delta^6$desaturase | ↓ |
| 18:3 $\Delta^{6,9,12}$ (γ-linolenic acid) | 18:4 $\Delta^{6,9,12,15}$ |
| ↓ elongation | ↓ |
| 20:3 $\Delta^{8,11,14}$ (dihomo-γ-linolenic acid) | 20:4 $\Delta^{8,11,14,17}$ |
| ↓ $\Delta^5$ desaturase | ↓ |
| 20:4 $\Delta^{5,8,11,14}$ (arachidonic acid) | 20:5 $\Delta^{5,8,11,14,17}$ |
| ↓ elongation | ↓ |
| 22:4 $\Delta^{7,10,13,16}$ (adrenic acid) | 22:5 $\Delta^{7,10,13,16,19}$ |
| ↓ $\Delta^4$ desaturase | ↓ |
| 22:5 $\Delta^{4,7,10,13,16}$ | 22:6 $\Delta^{4,7,10,13,16,19}$ |

The pathways are not normally reversible nor the n-3 and n-6 series acids interconvertible.

The acids, which naturally are of the all-cis configuration, are systematically named as derivatives of the corresponding octadecanoic, eicosanoic or docosanoic acids e.g. $\Delta^{9,12}$octadecadienoic acid or $\Delta^{4,7,10,13,16,19}$ docosahexaenoic acid, but numerical designation such as, correspondingly, 18:2n-6 or 22:6n-3 is convenient. Initials, for example, DHA for 22:6n-3 (docosahexaenoic acid), are also used but do not serve when n-3 and n-6 acids of the same chain length and degree of unsaturation exist. Trivial names in more or less common use in the n-6 series are as shown. Of the n-3 series only 18:3n-3 has a commonly used trivial name, α-linolenic acid. It was characterised earlier than γ-linolenic acid and reference in the literature simply to linolenic acid, especially in the earlier literature, is to the α-acid.

EXPERIMENTAL WORK

A trial was set up in which 12 chickens were fed normal chow and 12 chickens chow with 10% of evening primrose oil (EPO) containing 9% of γ-linolenic acid (i.e. 0.9% of chow by weight was γ-linolenic acid). An egg was taken from each bird every week. The figures reached a plateau at six weeks and the six week figures are therefore shown:

| | Normal Chow | EPO Chow |
|---|---|---|
| Egg weight g | 63.5 ± 3.4 | 72.0 ± 3.1 |
| % lipids in the egg | 18.8 ± 1.2 | 16.3 ± 0.8 |
| Total cholesterol/egg mg | 146 ± 7 | 132 ± 6 |
| Cholesterol concentration mg/g | 2.30 | 1.83 |
| Oleic acid in phospholipids (weight of fatty acids present) | 25.4 ± 1.1 | 16.4 ± 1.2 |
| Linoleic acid (weight of fatty acids present) | 15.6 ± 1.2 | 23.6 ± 2.1 |
| GLA (weight of fatty acids present) | Negligible | 0.6 ± 0.1 |
| DGLA (weight of fatty acids present) | 0.42 ± 0.1 | 0.67 ± 0.1 |
| Arachidonic acid (weight of fatty acids present) | 7.62 ± 0.59 | 7.42 ± 0.68 |
| 22:4n-6 (weight of fatty acids present) | 0.33 ± 0.07 | 0.49 ± 0.07 |
| 22:5n-6 (weight of fatty acids present) | 1.0 ± 0.23 | 1.75 ± 0.2 |

Thus GLA increased egg size, reduced cholesterol contentration and content per egg, and (with the exception of arachidonic acid) increased polyunsaturate concentration.

THE INVENTION

Three separate though related matters are therefore encompassed by the present invention.

(a) A method of increasing the size of the eggs of domesticated birds, particularly fowls, wherein the birds are fed a diet comprising one or more of γ-linolenic acid and higher acids in the n-6 series, as the free acid or as an ester, amide, phospholipid salt or other physiologically acceptable derivative convertible in the bird's body to, or having the effect of, the free acid.

(b) A method of lowering the weight percentage of cholesterol in such eggs and lowering also the total cholesterol content per egg wherein such diet is fed to such birds.

(c) A method of increasing the polyunsaturated fatty acid concentration in the lipids of such eggs (other than the arachidonic acid concentration) wherein such diet is fed to such birds.

In summary, the invention lies in a method of egg production (desirably of non-fertilised eggs) in domesticated birds, particularly fowls, wherein the birds are fed a diet as above to improve the eggs in respect of size, percentage or total cholesterol content, or polyunsaturate content.

The invention extends also to the eggs produced by such methods and to feed comprising natural or synthetic EFA's γ-linolenic acid and/or higher acids in the n-6 series or derivatives as above. A convenient amount of EFA or derivative to be fed is 0.01 to 10% preferably 0.1 to 2% by weight (calculated as γ-linolenic acid) of the feed.

DERIVATIVES

Convenient derivatives of γ-linolenic acid in particular include the $C_1$–$C_4$ alkyl (e.g. methyl) esters and the glycerides. Generally herein reference to an EFA is to be taken as including reference to the acid when in the form of a derivative. Convertability is demonstrated by entry into the pathway quoted herein, as evidenced by effects corresponding to those of the acids themselves or their natural glyceride esters. Thus, indirect identification of useful derivatives is by their having the valuable effect of the acid itself, but conversion can be shown directly by gas chromatographic analysis of concentrations in blood, body fat, or other tissue by standard techniques, for example those of Pelick et at. p. 23, "Analysis of Lipids and Lipoproteins" Ed. Perkins, American Oil Chemists Society, Champaign, Ill., U.S.A.

In outline the method is suitably that plasma or other samples (1 ml) are extracted with chloroform:methanol (2:1). The extract is filtered through sodium sulphate, evaporated to dryness, and taken up in 0.5 ml chloroform:methanol. The lipid fractions are separated by thin layer chromatography on silica gel plates. The phospholipid fraction, taken to reflect essential fatty acid contents most sensitively, is methylated using boron trifluoride-methanol. The resulting methyl esters of the fatty acids are separated and measured using a Hewlett Packard 5880 gas chromatograph with a six foot column packed with 10% silar on chromosorb WAW 106/230. The carrier gas is helium (30 ml/min). Oven temperature is programmed to rise from 165° C. to 190° C. at 2° C./min. Detector temperature is 220° C. and injector temperature 200° C. Retention times and peak areas are automatically computed by Hewlett Packard Level 4 integrator. Peaks are identified by comparison with standard fatty acid methyl esters.

SOURCES

It is at present convenient to incorporate γ-linolenic acid in the form of an available oil having a high γ-linolenic acid content. At the present time known natural sources of oils having a high γ-linolenic acid content are few (there are no known natural sources of significant amounts of dihomo-γ-linolenic acid). One source of oils currently available is the seed of Evening Primrose species such as *Oenothera biennis L.* and *Oenothera lamarckiana*, the oil extracted therefrom containing γ-linolenic acid (about 8%) and linoleic acid (about 72%) in the form of their glycerides together with other glycerides (percentages based on total fatty acids).

The seed oil can be used as such or can if desired be fractionated to yield an oily composition containing the triglycerides of γ-linolenic and linoleic acid as the main fatty acid components, the γ-linolenic acid content being if desired a major proportion. Seed oil extracts appear to have a stabilising effect upon any dihomo γ-linolenic acid or physiologically functional derivative thereof.

The oil is extracted from the seeds by one of the conventional methods of extraction such as cold pressure, screw pressure after partially cooking the seed, or solvent extraction.

Fractionation of a typical sample of this oil shows a yield of 97.0% oil in the form of methyl esters, with the relative proportions:

| | |
|---|---|
| Palmitate | 6.15 |
| Stearate | 1.6 |
| Oleate | 10.15 |
| Linoleate | 72.6 |
| γ-linolenate | 8.9 |

Sources of other n-6 EFA's are, for example from slaughter-houses but normally γ-linolenic acid will be preferred for economic reasons.

EXAMPLES

The experimental work quoted earlier herein is, as to the preparation of EPO chow and egg production using it, an example of the application of the invention. Similar results are obtainable by feeding normal chow supplemented by 50% or more of its weight of evening primrose seed residue after conventional extraction of the greater part of the oil by the methods referred to herein. Alternatives to the Evening Primrose seed are blackcurrant, redcurrant or gooseberry seed (*Ribes nigra, rubra, grossularia*), hop seed (Humulus sp.) or seeds of borage species such as *Borago officinalis* which, though current yield per acre is low, provide a richer source of γ-linolenic acid than Oenothera oil. Besides oil extraction residues, the seeds themselves may be fed, particularly for example seed cake from production of blackcurrant drinks. Moreover, recent studies on fungi which can be cultivated by fermentation promise a fungal oil source.

EXAMPLE 1

Laying hens are fed standard dry "layer's mash" as sold by feed compounders such as BOCM Silcock or Spillers at the rate of 120 g per bird per day, supplemented with Evening Primrose seed oil (approx. 8 or 9% γ-linolenic acid) 5 g, fed pre-mixed with a portion of the mash.

EXAMPLE 2

Hens are fed mash as last at 100 g per bird per day supplemented with 20 g Evening Primrose seed itself to give approximately 0.3 g γ-linolenic acid per bird per day.

EXAMPLE 3

Hens are fed mash as in Example 1 but reduced in amount to 75 g per bird per day with 50 g per bird per day of the residue from mechanical extraction of oil from Evening Primrose seed, giving ca. 0.05% γ-linolenic acid in the feed based on total feed weight.

EXAMPLE 4

Hens are fed mash as in Example 1 but reduced in amount to 100 g per bird per day with 50 g per bird per day of dry pip cake from extraction of blackcurrant juice for fruit drinks. The principal unsaturated fatty acids in the oil of such pips are in a typical analysis by weight:

| | |
|---|---|
| Oleic acid | 9.5% |
| Linoleic acid | 48% |
| γ-linolenic acid | 17.5% |
| α-linolenic acid | 13% | and, according to the variety and condition of growth, the dry pip cake may contain 20% lipid by weight, giving somewhat over 1% γ-linolenic acid based on feed weight.

I claim:

1. A method of improving the egg production of domesticated birds in respect of egg size, proportion or total cholesterol in the eggs, or proportion of unsaturated essential fatty acids in the eggs, comprising
   (i) feeding the birds a feed supplemented with one or more of gamma-linolenic acid and higher acids in the n-6 series, in the form of the free acid or as an ester, amide, phospholipid, salt or other physiologically acceptable derivative convertible in the bird's body to, or having the effect of, the free acid, the supplement, calculated as gamma-linolenic acid, constituting 0.01% to 10% by weight of the feed, and
   (ii) collecting the eggs produced by the birds whereby the egg size and proportion of unsaturated essential fatty acids in the eggs is increased and the proportion or total cholesterol in the eggs is decreased.

2. A method according to claim 1 wherein the feed is supplemented with Evening Primrose or other seed residue.

* * * * *